United States Patent
Oh et al.

(10) Patent No.: US 10,373,228 B2
(45) Date of Patent: Aug. 6, 2019

(54) KNOWLEDGE SHARING PLATFORM

(71) Applicants: Dong Suck Oh, Seoul (KR); Hyun Suck Oh, Seoul (KR)

(72) Inventors: Dong Suck Oh, Seoul (KR); Hyun Suck Oh, Seoul (KR)

( * ) Notice: Subject to any disclaimer, the term of this patent is extended or adjusted under 35 U.S.C. 154(b) by 413 days.

(21) Appl. No.: 15/220,311

(22) Filed: Jul. 26, 2016

(65) Prior Publication Data

US 2018/0033067 A1 Feb. 1, 2018

(51) Int. Cl.
G06Q 30/00 (2012.01)
G06Q 30/06 (2012.01)
G06N 3/00 (2006.01)

(52) U.S. Cl.
CPC ......... G06Q 30/0625 (2013.01); G06N 3/006 (2013.01)

(58) Field of Classification Search
CPC ..... G06Q 30/06; G06Q 30/0625; G06N 3/006
See application file for complete search history.

(56) References Cited

U.S. PATENT DOCUMENTS

| 7,343,328 B1* | 3/2008 | Smith | G06Q 30/0603 705/26.41 |
| 7,840,509 B1* | 11/2010 | Messina | G06Q 50/10 706/45 |
| 2005/0076082 A1* | 4/2005 | Le Pennec | H04L 51/24 709/206 |
| 2005/0203860 A1* | 9/2005 | D'Souza | G06N 5/04 706/50 |
| 2007/0214032 A1* | 9/2007 | Sciuk | G06Q 10/1053 705/7.29 |

(Continued)

FOREIGN PATENT DOCUMENTS

| KR | 10-2004-0089418 | 10/2004 |
| KR | 10-2008-0068482 | 7/2008 |
| KR | 10-1342454 | 7/2011 |

OTHER PUBLICATIONS

Irv Englander "The Architecture of Computer Hardware, System Software, and Networking" Fourth Edition, Copyright ® 2009 John Wiley & Sons, Inc. ISBN-13: 978-0471-71542-9 (Year: 2009).*

(Continued)

Primary Examiner — Naeem U Haq
(74) Attorney, Agent, or Firm — McDermott Will & Emery LLP

(57) ABSTRACT

Disclosed is a method for providing knowledge based sharing performed by a computing device including one or more processors and a main memory storing commands executable by the processors. The method may include: collecting, by a collection module, a question and an answer for the question from a knowledge sharing platform; extracting, by a process extracting module, a process for solving the question from the answer by analyzing the collected answer; tagging, by a process processing module, additional information on the respective processes to the extracted processes and storing the tagged additional information; receiving, by a communication module, search information from a user terminal; and providing, by the communication module, at least one of the answer, the process, and the tagged additional information corresponding to the search information to the user terminal.

9 Claims, 8 Drawing Sheets

(56) References Cited

U.S. PATENT DOCUMENTS

| | | | | |
|---|---|---|---|---|
| 2009/0307159 A1* | 12/2009 | Pinckney | ............... | G06N 20/00 |
| | | | | 706/11 |
| 2015/0074112 A1* | 3/2015 | Liu | ................... | G06F 17/30023 |
| | | | | 707/739 |
| 2017/0316085 A1* | 11/2017 | Gupta | ................... | G06F 16/243 |

OTHER PUBLICATIONS

Y. Duan et al. "Web-based expert systems: benefits and challenges", Information & Management 42 (2005) 799-811. (Year: 2004).*

* cited by examiner

FIG. 5

(A) re: : PROCEDURE AND KNACK FOR PURCHASING USED CAR     RECOMMENDING ANSWER

****(amsdkdh124860 | ANSWER ADOPTION RATE 37.9% | 20XX.0X.XX 12:36    👍 5

HI! THIS IS *** USED CAR SALESMAN.

ANSWER FOR QUESTION IS AS FOLLOWS.

1. HONDA ACCORD 3.5 SEDAN 8-TH GENERATION (08.05/BLACK)(IN/1950) WHETHER PRODUCTION YEAR AND THE NUMBER OF KILOMETERS ARE EXCELLENT COMPARED WITH PRICE
- IF 19.5 MILLION WON IS DEALING PRICE, IT IS PROPER PRICE.
PRICE OF RELEVANT VEHICLE MAY BE LOWER THAN DEALING PRICE.

2. PROCEDURE FOR PURCHASING USED CAR (PLEASE, DESCRIBE PROCEDURE IN DETAIL.) — 331
(HOW MUCH AMOUNT OF MONEY I SHOULD PAY FOR PURCHASING USED CAR.)
(I AM SCHEDULED TO APPLY 1-YEAR COMPREHENSIVE INSURANCE. I AM MALE WHICH IS 21 YEARS OLD. I HAVE MILITARY DRIVING CAREER.) — 333, 332
- IF YOUR CAR IS NOT PRIVATE SALE, YOU SHOULD GO TO USED CAR DEALING COMPLEX. WHEN YOU GO TO DEALING COMPLEX, YOU SHOULD FIRST PREPARE CONTRACT AFTER CHECKING INTERIOR AND EXTERIOR OF VEHICLE, SUFFICIENTLY PERFORMING TEST-DRIVE, AND ACCURATELY RECEIVING NOTIFICATION OF WHETHER ACCIDENT OCCURS IN CORRESPONDING VEHICLE AND VEHICLE PERFORMANCE RECORD. IF YOU PAY VEHICLE PAYMENT, ACQUISITION/REGISTRATION TAX, AND USED CAR DEALING FEE (SELLING FEE, COMMISSION FEE, AND THE LIKE), USED CAR DEALING COMPLEX WILL DEPUTIZE VEHICLE TRANSFER. IN ASSOCIATION WITH INSURANCE, MILITARY DRIVING CARRIER DOES NOT APPLY TO YOU AND YOU WILL BE REGARDED AS NEW APPLICATION. WHEN YOU APPLY SELF-VEHICLE INSURANCE, INSURANCE PREMIUM WILL BE APPROXIMATELY 2 MILLION WON.
— 334

3. PLEASE, KNACK OR CAUTIONS FOR PURCHASING USED CAR.
341 — 
- SINCE VEHICLE IS EXPENSIVE, YOU SHOULD CHECK VEHICLE WITH YOUR EYES, SUFFICIENTLY PERFORM TEST DRIVE, AND RECEIVE NOTIFICATION OF VEHICLE PERFORMANCE RECORD AND CAREFULLY CHECK WHAT ACCIDENT RANGE IS OR WHETHER VEHICLE IS COMPLETELY REPAIRED IF ACCIDENT OCCURS IN VEHICLE. I HOPE YOU TO PURCHASE BEST CAR.

KNOWLEDGE SHARING PLATFORM

TECHNICAL FIELD

The present disclosure relates to a method performed on the Internet, and more particularly, to a method for providing a platform capable of offering a product and a service based on knowledge.

BACKGROUND ART

In general, the Internet as an open network is configured to be arbitrarily connected and used by applying a common protocol called Transmission Control Protocol/Internet Protocol (TCP/IP) to a counterpart computer which everybody intends to access anywhere in the world can use various services such as e-mail, file transmission, World Wide Web (WWW), and the like which are used for transferring basic text information, developing a compression technique, and transferring multimedia information.

The importance of the Internet as a strategic tool for promoting efficiency and productivity throughout all fields of the existing industry has rapidly increased as the Internet is rapidly increasingly used worldwide including in Korea and new business opportunities through the Internet have been continuously created and areas of business have tended to extend, and as a result, business operators using the Internet have gradually increased.

Mobile Internet using a cellular phone, a PDA, and an IMT2000 service has been rapidly increasingly used in recent years and the service has been explosively increased as fast as the initial increase speed of Internet users.

That is, in recent years, businesses through the Internet have repeated development to create a more improved new business model such as Avatar transaction and a question and answer type knowledge search service over business models including Internet search, shopping mall, an auction, and the like in an initial stage.

In the related art, Internet shopping malls are configured for each item or item category and consumers individually search information on the item and the service according to a process for purchase wants thereof to determine the item and the service and thereafter, satisfy the purchase wants by using a purchase site such as the shopping mall, or the like. However, the search time for determining the item and the service is long and it is difficult even to acquire information on a store. Further, since a purchase intention for a special sold item or service should be decided only on a limited site, there is a problem in that it is difficult to provide a definite criterion for comparing a price or the service.

Accordingly, the consumer can ask a question about such a complicated process on the Internet and perform such a purchase action according to an answer to the question.

SUMMARY OF THE INVENTION

The present disclosure has been made in an effort to provide additional knowledge for respective processes included in an answer in a knowledge service.

The present disclosure has also been made in an effort to easily search a desired item and knowledge only by a category and an object for information search without going through a complicated process in order to find an item and knowledge desired by a consumer.

An exemplary embodiment of the present disclosure provides a method for providing knowledge based e-commerce performed by a computing device including one or more processors and a main memory storing commands executable by the processors. The method may include: collecting, by a collection module, a question and an answer for the question from a knowledge sharing platform; extracting, by a process extracting module, a process for solving the question from the answer by analyzing the collected answer; tagging, by a process processing module, additional information on the respective processes to the extracted processes and storing the tagged additional information; receiving, by a communication module, search information from a user terminal; and providing, by the communication module, at least one of the answer, the process, and the tagged additional information corresponding to the search information to the user terminal.

Another exemplary embodiment of the present disclosure provides a server for providing knowledge based e-commerce. The server may include: one or more processors; and a memory storing commands which are executable by the processors, wherein the one or more processors include a collection module collecting a question and an answer for the question from a knowledge sharing platform, a process extracting module extracting a process for solving the question from the answer by analyzing the collected answer, a process processing module tagging additional information on the respective processes to the extracted processes, and a communication module receiving search information from a user terminal and providing at least one of the answer, the process, and the tagged additional information corresponding to the search information to the user terminal.

Still another exemplary embodiment of the present disclosure provides a non-transitory computer-readable storage medium including a plurality of commands executed by one or more processors for providing knowledge based e-commerce. The non-transitory computer-readable storage medium allows a computer to execute the following steps by the plurality of commands stored in the non-transitory computer-readable storage medium and the steps may include: collecting, by a collection module, a question and an answer for the question from a knowledge sharing platform; extracting, by a process extracting module, a process for solving the question from the answer by analyzing the collected answer; tagging, by a process processing module, additional information on the respective processes to the extracted processes and storing the tagged additional information; receiving, by a communication module, search information from a user terminal; and providing, by the communication module, at least one of the answer, the process, and the tagged additional information corresponding to the search information to the user terminal.

The present disclosure can provide additional knowledge for respective processes included in an answer in a knowledge service.

The present disclosure can easily search a desired item and knowledge only by a category and an object for information search without going through a complicated process in order to find an item and knowledge desired by a consumer.

BRIEF DESCRIPTION OF THE DRAWINGS

FIG. 5 illustrates a more detailed example of analysis of an answer according to an exemplary embodiment of the present disclosure.

DETAILED DESCRIPTION

Various exemplary embodiments and/or aspects are now disclosed with reference to drawings. In the following description, for description, multiple detailed matters are disclosed in order to help overall understanding of one or more aspects. However, those skilled in the art will recognize even that the aspect(s) can be executed without the detailed matters. In the following disclosure and the accompanying drawings, specific exemplary aspects of one or more aspects will be described in detail. However, the aspects are exemplary and some among various methods in principles of various aspects may be used and the descriptions are intended to include all of the aspects and equivalents thereof.

Further various aspects and features will be presented by a system which can include multiple devices, components, and/or modules. It should also be appreciated and recognized that various systems can include additional devices, components, and/or modules and/or that the various systems cannot include all of devices, components, modules, and the like discussed in association with the drawings.

In "embodiment", "example", "aspect", "illustration", and the like used in the specification, it may not be construed that a predetermined aspect or design which is described is more excellent or advantageous than other aspects or designs. 'Component', 'module', 'system', 'interface', and the like which are terms used below generally mean computer-related entities and mean, for example, hardware, a combination of hardware and software, or software.

The term "or" is intended to mean not exclusive "or" but inclusive "or". That is, when not separately specified or not clear in terms of context, the case where "X uses A or B" is intended to mean one of natural inclusive substitutions. That is, in the case where "X uses A or B" may be applied to either of the case where X uses A, the case where X uses B, or the case where X uses both A and B. Further, it should be understood that the term "and/or" used in the specification designates and includes all available combinations of one or more items among enumerated related items.

The word "comprises" and/or "comprising" means that the corresponding feature and/or component is present, but it should be appreciated that presence or inclusion of one or more other features, components, and/or a group thereof is not excluded. Further, when not separately specified or not clear in terms of the context by indicating a singular form, it should be construed that the singular generally means "one or more" in the present specification and the claims.

Figure 1:
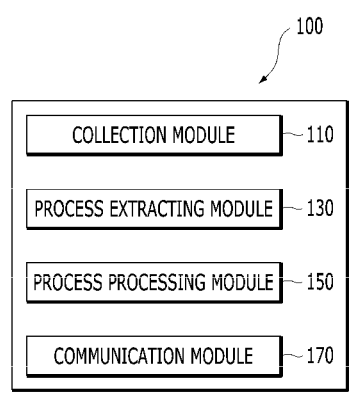
FIG. 1 is a block diagram of a server for providing knowledge based e-commerce according to an exemplary embodiment of the present disclosure.

FIG. 1 is a block diagram of a server for providing knowledge based e-commerce according to an exemplary embodiment of the present disclosure.

The server 100 for providing knowledge based e-commerce according to the exemplary embodiment of the present disclosure includes one or more processors (not illustrated) and a memory (not illustrated) storing commands which may be executed by the processor and the processor may include a collection module 110, a process extracting module 130, a process processing module 150, a communication module 170, and a communication module 190.

The collection module 110 may collect a question and an answer for the question from a knowledge sharing platform. The knowledge sharing platform of the present disclosure may be a platform of a type in which a user arbitrarily asks a question and an answerer arbitrarily answers a question. A plurality of unspecific users may make a question and perform the answer for the question by taking part and the questions and the answers are accumulated to be used as knowledge data.

The knowledge sharing platform may be a knowledge sharing platform in which the answer is input to be separated for each process. For example, when a questioner questions a task which may be processed for each step, the answerer may make an answer for each step and the knowledge sharing platform may be a knowledge sharing platform which separates the answer for each process by a column and a partition so as to receive the answer for each step. Therefore, the collection module 110 may collect the answer separated for each process when collecting the answer separated by the column and the partition. A disclosure associated with separating the answer for each process in the knowledge sharing platform described above is just an example and the answer may be received while being separated for each process by a predetermined method in the knowledge sharing platform.

The collection module 110 may arbitrarily collect the questions of the users and the answers for the questions from the knowledge sharing platform. The knowledge sharing platform may be included in the server 100 according to the exemplary embodiment of the present disclosure. Further, the knowledge sharing platform may be included in a separate knowledge sharing server other than the server 100 of the present disclosure. The collection module 110 of the present disclosure may collect the questions and the answers of a knowledge sharing platform included in the server 100 and collect questions and answers of a knowledge sharing platform included in an external server. Further, the collection module 110 may collect questions and answers of the knowledge sharing platform which is present on the Internet and online. The questions and the answers according to the exemplary embodiment of the present disclosure may include at least contents associated with e-commerce. The contents associated with e-commerce may include contents associated with purchase, selling and manufacturing of items or purchasing and selling of services. A disclosure of the contents associated with e-commerce described above is just an example and the present disclosure may include contents associated with predetermined e-commerce. An operation associated with answer collection of the collection module 110 as an action such as search, crawling or collecting information stored in a computer is consequently performed in a computer device.

The process extracting module 130 may extract a process for solving the question from the answer by analyzing the collected answer. For example, when the answer for the question includes contents for describing the process for solving the question, the process extracting module 130 may extract the process for solving the question from the answer by analyzing the collected answer. Further, the process extracting module 130 may determine a category of the collected answer and tag an object to the answer. In addition, the process extracting module 130 may determine a category of the collected question and tag the object to the question.

The process extracting module 130 may collect feedback information of the questioner for the answerer of each answer, determine reliability of the answerer based on the collected feedback information, extract a keyword by collecting an answer of an answerer in which the reliability is equal to or higher than a predetermined threshold, and separate the answer into one or more processes at least partially based on the extracted keyword. In the knowledge sharing platform, the questioner may feed back whether the corresponding answer becomes the answer for the question with respect to the answer of the answerer. For example, when the answer of the answerer plays a decisive role in solving the question with respect to matters questioned by the questioner, the questioner may give a feedback such as high satisfaction or scoring with respect to the corresponding answer and answerer. The process extracting module 130 collects the feedback information and determines the reliability of the answerer based on the feedback information. The reliability is determined for each answerer and the answerer for whom the reliability is equal to or higher than the threshold may be determined as an answerer who is reliable. The process extracting module 130 may extract a keyword from the answers by collecting the reliable answers. Additionally, for example, a fuzzy algorithm may be used for the keyword extraction and the process extracting module 130 may extract the keyword based on a fuzzy algorithm. The process extracting module 130 may separate the answer into one or more processes at least partially based on the extracted keyword. The process extracting module 130 may separate the answer into one or more processes at least partially based on the keyword and the number of repetition times of a keyword associated with the keyword in the answer. For example, when the question is associated with purchasing of a used car, the answer may be separated into processes including "a used car searching step", "a used car complex visiting step", "a vehicle checking step before a contract", "a contract step", "a transfer step", and the like. In this case, when keywords including "a service station", "an interior and an exterior", and the like are present with respect to vehicle checking, a sentence or paragraph including the corresponding keyword in the answer may be separated into the "checking step before the contract" process. The question, the answer, the process, and the keyword described above are just examples and the present disclosure includes a predetermined question, a predetermined answer, a predetermined process, and a predetermined keyword.

The process extracting module 130 may collect feedback information for the answer, determine the reliability of the answer based on the collected feedback information, extract the keyword by collecting an answer in which the reliability is equal to or higher than a predetermined threshold, and separate the answer into one or more processes at least partially based on the extracted keyword. In the knowledge sharing platform, the questioner may feedback whether the answer becomes the answer for the question. For example, when the answer of the answerer plays a decisive role in solving the question with respect to matters questioned by the questioner, the questioner may give a feedback such as high satisfaction or scoring with respect to the corresponding answer. The process extracting module 130 collects the feedback information and determines the reliability of the answer based on the feedback information. The reliability is determined for each answer and an answer for which the reliability is equal to or higher than the threshold may be determined as an answer which is reliable. The process extracting module 130 may extract a keyword from the answers by collecting the reliable answers. Additionally, for example, a fuzzy algorithm may be used for the keyword extraction and the process extracting module 130 may extract the keyword based on a fuzzy algorithm. The aforementioned operations of the process extracting module 130 are performed as a part of information processing for data stored in the computer device and consequently performed by the computer device.

The process processing module 150 may tag additional information on the respective processes with respect to the extracted process. The additional information may include at least one of a URL link, a contact, a map, and an address associated with the process. The URL link may be a link including the additional information on the process. Further, the URL link may be a link for URL that sells items or services associated with the process. For example, in the case of the answer for the question associated with the purchasing of a used car, the process processing module 150 may tag a download address of an SK Encar mobile app or the URL link of Bobaedream with respect to the "used car searching step" process or tag the additional information including the address of a used car complex, and the like with respect to the "used car complex visiting step" process. Further, the process processing module 150 may tag the URL link of a website that sells car insurance with respect to, for example, an "insurance applying step in purchasing a used car" process. The additional information described above is just an example and the process processing module 150 may tag predetermined additional information. Further, the server 100 may store the collected questions and answers, the category of the answer, the object tagged to the answer, the process, and the tagged additional information in a storage space (not illustrated). The aforementioned operations of the process processing module 150 are performed as a part of information processing for data stored in the computer device and consequently performed by the computer device.

The communication module 170 may receive search information from a user terminal (not illustrated). The communication module 170 may receive category information and the object from the user terminal. The search information may include the category information and the object. For example, as described in the example, the communication module 170 may receive the category information such as "purchase" and the object such as "used car" from the user terminal. The user terminal may include a personal computer (PC), a notebook, a mobile terminal, a smart phone, a tablet PC, and the like and includes all kinds of terminals which may access a wired/wireless network.

The communication module may include a wired/wireless Internet module for accessing the network. As wireless Internet technology, Wireless LAN (WLAN) (Wi-Fi), Wireless broadband (Wibro), World Interoperability for Microwave Access (Wimax), High Speed Downlink Packet Access (HSDPA), and the like may be used. As wired Internet technology, X Digital Subscriber Line (XDSL), Fibers to the home (FTTH), power line communication (PLC), and the like may be used.

The communication module 170 may provide at least one of the answer, the process, and the tagged additional information corresponding to the search information to the user terminal. For example, the communication module 170 may provide at least one of the answer, the process, and the tagged additional information associated with the used car purchasing as described in the example. The communication module 170 may provide at least one of the answer, the process, and the tagged additional information to the user terminal by using the wired/wireless network. The aforementioned operation of the communication module 170 is implemented as information communication technology and consequently performed by the computer device.

Figure 2:
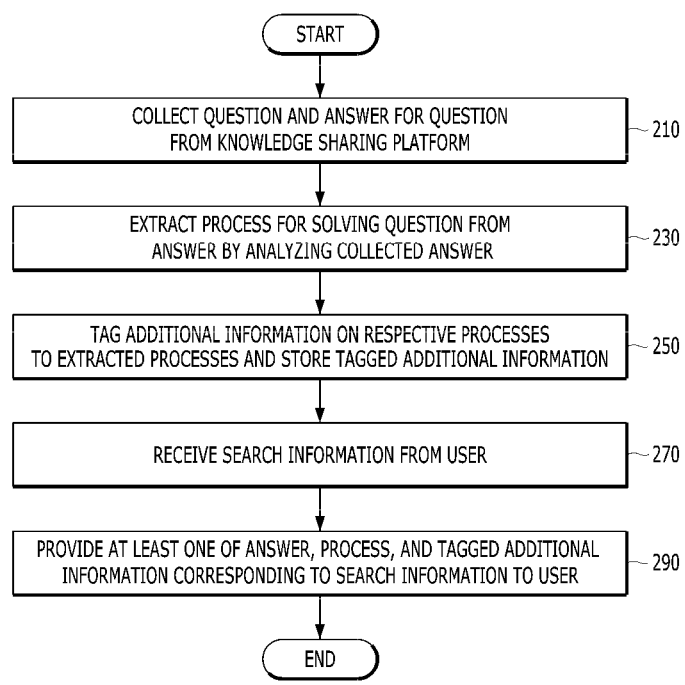
FIG. 2 is a flowchart of a method for providing knowledge based e-commerce according to an exemplary embodiment of the present disclosure.

FIG. 2 is a flowchart of a method for providing knowledge based e-commerce according to an exemplary embodiment of the present disclosure.

The server 100 may collect the question and the answer for the question from the knowledge sharing platform (210). The knowledge sharing platform may be a platform of a type in which the users arbitrarily ask questions and answerers arbitrarily answers the questions. Further, in the exemplary embodiment of the present disclosure, the knowledge sharing platform may be a knowledge sharing platform in which the answer is input to be separated for each process. Further, as described above, the questions and the answers according to the exemplary embodiment of the present disclosure may include at least contents associated with e-commerce.

The server 100 may extract the process for solving the question from the answer by analyzing the collected answer (230). Further, the server 100 may determine the category of at least one of the collected question and answer and tag the object to at least one of the question and the answer.

For example, in the case of the question associated with the used car purchasing, the category of the question may be determined as "purchase" and the object may be "used car". In more detail, for the question "What is the present price of a used car such as an AVANTE XD 2006? The AVANTE XD 2006 is scheduled to be purchased", the server 100 may determine the category of the question as "purchase". Further, the server 100 may tag the object such as "used car" to the question. For example, as described above, in the case of a question associated with used car purchasing, the category of the answer may be determined as "purchase" and the object may be "used car". Further, the server 100 may extract the process of "used car purchasing" by analyzing the answer. The extracted process may be processes including "used car searching step", "used car complex visiting step", "vehicle checking step before the contract", "contract step", "transfer step", and the like.

The server 100 may tag the additional information on the respective processes to the extracted processes and store the tagged additional information (250). As described above, the additional information may include at least one of a URL link, a contact, a map, and an address associated with the process.

For example, as described above, in the case of the question associated with the used car purchasing, the server 100 may tag the additional information such as the download links of the SK encar mobile app, and the like with respect to the process of "used car searching step".

The server 100 may receive the search information from the user terminal (270). To this end, the server 100 may include the wired/wireless Internet module for accessing the network. Further, the server 100 may receive the category information and the object from the user terminal. The server 100 may receive the search information to search the answer, the process, and the tagged additional information from the user terminal.

The server 100 may provide at least one of the answer, the process, and the tagged additional information corresponding to the search information to the user terminal (290). The server 100 may provide at least one of the answer, the process, and the tagged additional information corresponding to the search information to the user terminal through the network.

Figure 3:
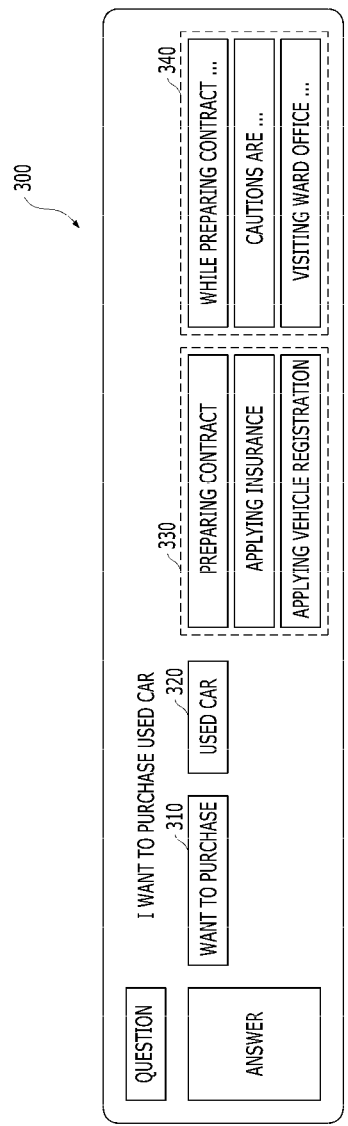
FIG. 3 illustrates an example of an analysis data table of a question and an answer which are collected according to an exemplary embodiment of the present disclosure.

FIG. 3 illustrates an example of an analysis data table of a question and an answer which are collected according to an exemplary embodiment of the present disclosure.

An analysis data table of the collected question and answer according to the exemplary embodiment of the present disclosure may include a category 310, an object 320, a process 330, and detailed contents 340 of the process in the answer.

The category 310 of the answer may be a category associated with a type of wants of the questioner and the answerer. As described above, the questions and the answers according to the present disclosure may include at least contents associated with e-commerce. The type of the want of the questioner or answerer associated with e-commerce may be associated with purchasing, selling and manufacturing of items or purchasing and selling of services. Therefore, the category 310 may classify the type of the want of the questioner or the answerer into "want to purchase", "want to sell", "want to make", and the like. "Target" may be present in the want of the questioner or answerer and the target of the want may become the object 320. The answerer may answer a process for satisfying the want of the questioner and such a process may become the process 330. The process 330 may include the detailed contents 340 of the process for each process. The detailed contents 340 of the process may include contents to separate the answer prepared by the answerer for each process.

In the example illustrated in FIG. 3, when the question is "I want to purchase the used car" and the answer is contents associated with the process of purchasing the used car, the want of the user is "want to purchase" in the answer, therefore, the category of the answer may become "purchase". Further, the answer is contents associated with the process of purchasing the "used car" and the object 320 of the want such as the "purchase" may become the "used car". The answerer may answer the process of purchasing the used car and in the example illustrated in FIG. 3, as the process of purchasing the used car, "contract preparing step", "insurance applying step", and "vehicle registration applying step" may become the process 330 of purchasing the used car. The server 330 may extract the process 330 described in the example by analyzing the answer.

Figure 4:
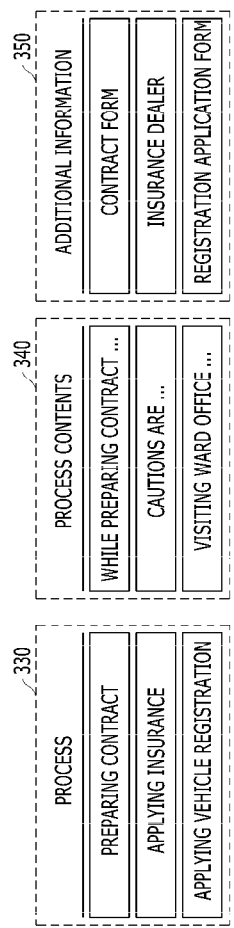
FIG. 4 illustrates an example of analysis of an answer according to an exemplary embodiment of the present disclosure.

FIG. 4 illustrates an example of analysis of an answer according to an exemplary embodiment of the present disclosure.

FIG. 4 illustrates a more detailed example of analyzing an answer and separating the answer into processes according to an exemplary embodiment of the present disclosure.

FIG. 4 illustrates an example of analyzing the answer for the question such as "I want to purchase the used car" as illustrated in FIG. 3. As illustrated in FIG. 4, The answerer may answer the process of purchasing the used car for the question such as "I want to purchase the used car" and in the example illustrated in FIG. 4, as the process of purchasing the used car, the "contract preparing step", the "insurance applying step", and the "vehicle registration applying step" may become the process 330 of purchasing the used car. The detailed contents 340 of the process may include contents to separate the answer contents prepared by the answerer for each process described above. Further, the server 100 may tag the additional information 350 with respect to the respective processes. As described above, the additional information 350 on the process may include at least one of the URL link, the contact, the map, and the address associated with the process.

In the example of FIG. 4, the detailed contents 340 of the process, which may include contents including cautions while preparing the contract such as "while preparing the contract" prepared by the answerer, are present in the "contract preparing" process 330. The server 100 may tag the additional information 350 for each separated process 330 and additional information to the "contract preparing" process 330 may become a download link of "contract form". The process, the detailed contents, and the additional information described above are just examples and the present disclosure may include a predetermined process, predetermined process detailed information, and predetermined additional information.

FIG. 5 illustrates a more detailed example of analysis of an answer according to an exemplary embodiment of the present disclosure.

FIG. 5 illustrates the answer, the keyword, and the detailed contents of the process. In FIG. 5, The text following "Hi! This is * * * a used car used car salesman." corresponds to the answer. The server 100 may analyze the answer. Recommending the answer may be a feedback for the answer. The server 100 may collect the answer, extract the keyword from the answer, and extract the process for solving the question.

In the FIG. 5, "If your car is not a private sale, you should go to a used car dealing complex. When you go to the dealing complex, you should first prepare a contract after checking the interior and the exterior of a vehicle, sufficiently performing test-drive, and accurately receiving a notification of whether an accident occurs in the corresponding vehicle and a vehicle performance record. If you pay a vehicle payment, an acquisition/registration tax, and a used car dealing fee (selling fee, a commission fee, and the like), the used car dealing complex will deputize vehicle transfer. In association with insurance, a military driving carrier does not apply to you and you will be regarded as new application. When you apply self-vehicle insurance, an insurance premium will be approximately 2 million won." corresponds to the answer. Herein, "vehicular interior/exterior 331", "test drive 332", "insurance associated matters 333", and "knack or cautions 334" may correspond to the keyword. The server 100 analyzes the answer to divide the answer into the process 330 such as "step of checking the vehicular interior/exterior", "test drive step", "insurance applying step", and "other cautions step".

In the answer of FIG. 5, "Since the vehicle is expensive, you should check the vehicle with your eyes, sufficiently perform the test drive, and receive the notification of the vehicle performance record and carefully check what an accident range is or whether the vehicle is completely repaired if the accident occurs in the vehicle. I hope you to purchase a best car. (341)" as the answer may correspond to the detailed contents 340 of the process of the "other cautions step".

Figure 6:
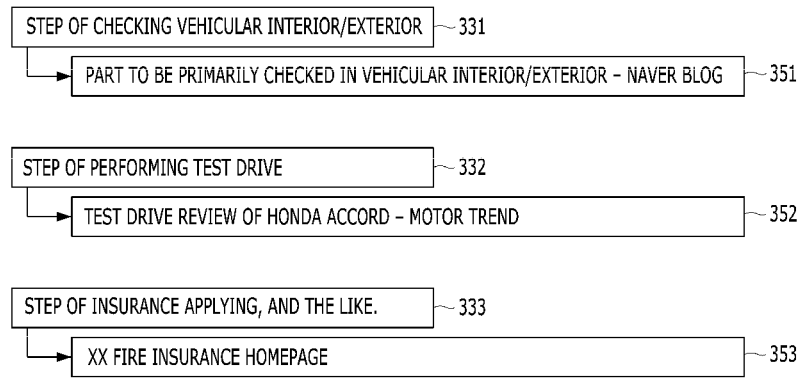
FIG. 6 illustrates an example of additional information of an analyzed answer according to an exemplary embodiment of the present disclosure.

FIG. 6 illustrates an example of additional information of an analyzed answer according to an exemplary embodiment of the present disclosure.

FIG. 6 illustrates an example of additional information tagged for each process of the answer analyzed in FIG. 5. In FIG. 5, the server 100 may divide the answer into the process 330 such as the "step of checking the vehicular interior/exterior", the "test drive step", the "insurance applying step", and the "other cautions step".

In this case, the server 100 may tag a link of a blog web document associated with "a part to be primarily checked in the interior/exterior of the vehicle" in a special blog for the vehicle with respect to the "step of checking the vehicular interior/exterior". Therefore, the user may easily obtain detailed information including "information on a place which becomes rusty on the bottom of a vehicle body, and the like", "method for finding a trace of the accident", and the like in the "step of checking the vehicular interior/exterior". For example, when the answer is described only by a word, the additional information is transferred to the user through a photograph to allow the user to cleverly and conveniently perform a desired dealing action by more well understanding answer contents.

The server 100 may tag a link of "a test-drive review" document loaded in an automobile magazine with respect to the "step of perform the test drive". Therefore, the user may more easily obtain detailed information regarding check points while test-driving the vehicle, and the like.

The server 100 tags the URL link of a fire insurance homepage with respect to the "step of applying for insurance, and the like" to allow the user to more easily verify insurance information and easily apply for insurance, thereby accurately and conveniently satisfy the want of the user. Additional information associated with a business such as an insurance company homepage may be tagged to a corresponding company by receiving a predetermined advertisement fee.

As described above, according to the exemplary embodiment of the present disclosure, the questions and answers which the users arbitrarily question and answer in a community, and the like are collected, and as a result, the tagged additional information may be provided together with the questions and the answers. Further, according to the exemplary embodiment of the present disclosure, a user who searches the question, the answer, and/or the additional information described above may be allowed to access easily the question, the answer, and/or the additional information by inputting only the category and the object.

Figure 7:
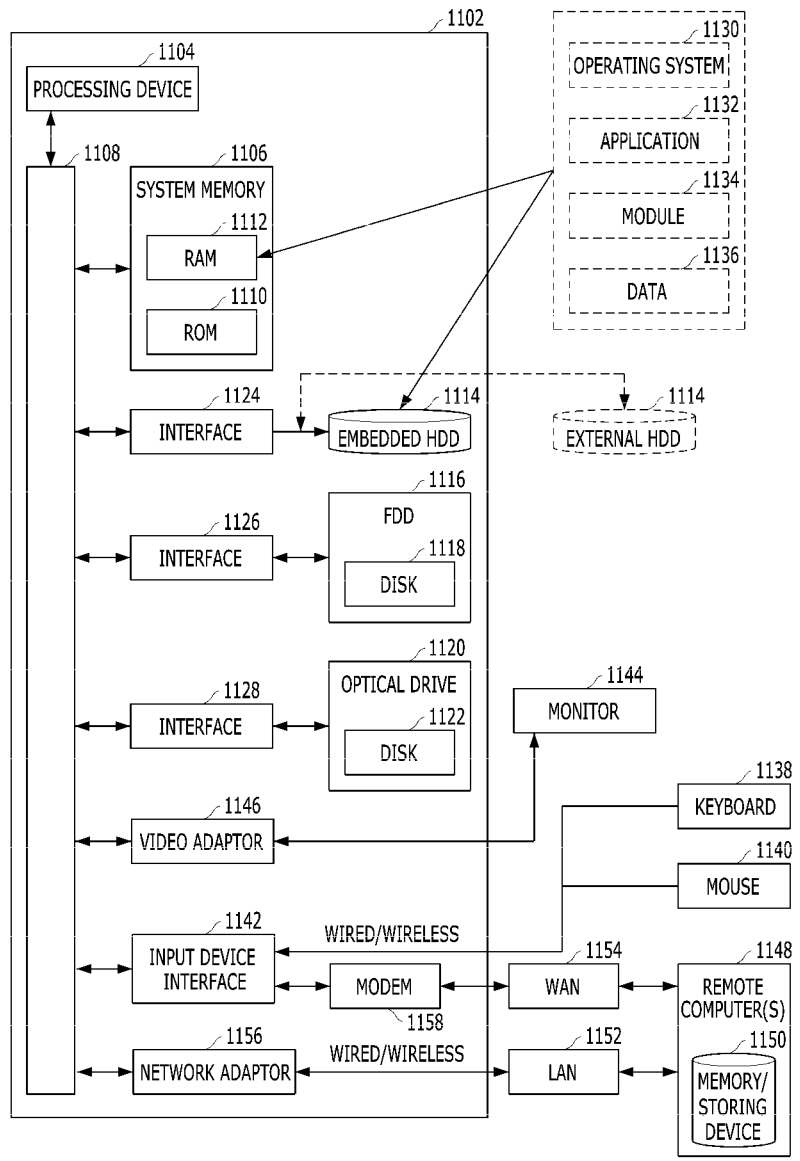
FIG. 7 is a block diagram of a computer which performs an operation of executing a computer program for providing knowledge based e-commerce according to an exemplary embodiment of the present disclosure.

FIG. 7 is a block diagram of a computer which performs an operation of executing a computer program for providing knowledge based e-commerce according to an exemplary embodiment of the present disclosure.

Referring to FIG. 7, simple and general description of an appropriate computing environment in which various aspects of an exemplary embodiment according to the present disclosure may be implemented may be provided.

The present disclosure has generally been described above in association with a computer executable command which may be executed on one or more computers, but it will be well appreciated by those skilled in the art that the present disclosure can be implemented through a combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices) as well as a single-processor or multi-processor computer system, a mini computer, and a main frame computer.

The aspects described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, and mobile and non-mobile media. As not a limit but an example, the computer readable medium may include both a computer storage medium and a communication medium. The computer storage medium includes all of the volatile and non-volatile and the mobile and non-mobile media implemented by a predetermined method or technology for storing information such as a computer readable command, a data structure, a program module, or other data. The computer storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The communication media generally implement the computer readable command, the data structure, the program module, or other data in a carrier wave or a modulated data signal such as other transport mechanism and include all information transfer media. The term modulated data signal means a signal acquired by configuring or changing one or more of characteristics of the signal so as to encode information in the signal. As not a limit but an example, the communication media include wired media such as a wired network or a direct-wired connection and wireless media such as acoustic, RF, infrared and other wireless media. A combination of any media among the aforementioned media is also included in the range of the computer readable media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an embedded hard disk drive (HDD) 1114 (for example, EIDE and SATA)—the embedded hard disk drive (HDD) 1114 may also be configured for an exterior purpose in an appropriate chassis (not illustrated)—, a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable command, and others. In the case of the computer 1102, the drives and the media correspond to storing predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in various operating systems which are commercially usable or a combination of the operating systems.

A user may input commands and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. The devices and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a server computer, a router, a personal computer, a portable computer, a microprocessor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and the like and all of them may be connected to a worldwide computer network, for example the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication in the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication server on the WAN 1154 or connection through the Internet. The modem 1158 which may be an embedded or exterior and wired or wireless device is connected to the system bus 1108 through the serial port interface 1142. In the networked environment, the program modules described with respect to the computer 1102 or some aspect thereof may be stored in the remote memory/storage device 1150. The illustrated network connection is exemplary and it will be well appreciated that other means configuring a communication link among computers may be used.

The computer 1102 performs an operation of communicating with predetermined wireless devices or entities which are disposed and operated by the wireless communication, for example the printer, a scanner, a desktop and/or portable computer, a portable data assistant (PDA), a communication satellite, predetermined equipment or place (for example, a kiosk, a newsstand, and a toilet) associated with a wireless detectable tag, and a telephone. This at least includes Wi-Fi and a Bluetooth™ wireless technology. Accordingly, communication may be a predefined structure like the network in the related art or just ad hoc communication between at least two devices.

Wireless fidelity (Wi-Fi) enables connection to the Internet, and the like from a sofa of a home, a bed of a hotel room, or a conference room of an office without a wired cable. Wi-Fi is a wireless technology such as a device, for example a cellular phone, which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands), therefore, the network may provide actual performance similar to a basic 10BaseT wired Ethernet network used in a lot of offices.

Figure 8:
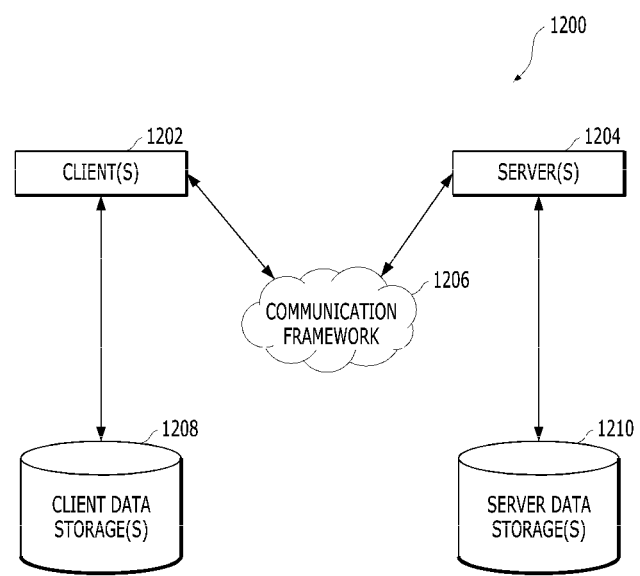
FIG. 8 is a schematic block diagram of an exemplary computing environment that executes a computer program for providing knowledge based e-commerce according to an exemplary embodiment of the present disclosure.

FIG. 8 is a schematic block diagram of an exemplary computing environment that executes a computer program for providing knowledge based e-commerce according to an exemplary embodiment of the present disclosure.

Referring to FIG. 8, a system 1200 includes one or more client(s) 1202. The client(s) 1202 may be hardware and/or software (for example, a thread, a process, and a computing device). The client(s) 1202 may, for example, keep a cookie(s) and/or associated situational information by using the present disclosure.

The system 1200 also includes one or more server(s) 1204. The server(s) 1204 may also be the hardware and/or software (for example, the thread, the process, and the computing device). The server 1204 may, for example, keep the thread which performs conversion by using the present disclosure. One available communication between the client 1202 and the server 1204 may be a form of a data packet configured to be transmitted among two or more computer processes. The data packet may include, for example, the cookie(s) and/or the associated situational information. The system 1200 includes a communication framework 1206 (for example, a global communication network such as Internet, and the like) which may be used for facilitating communications between the client(s) 1202 and the server(s) 1204.

Wired (including an optical fiber) and/or wireless technology may facilitate the communication. The client(s) 1202 operate(s) in connection with one or more client data storage(s) 1208 which may be used for storing information (for example, the cookie(s) and/or the associated situational information) which is local to the client(s) 1202. Similarly to this, the server(s) 1204 operate(s) in connection with one or more server data storage(s) 1210 which may be used for storing information which is local to the servers 1204.

The components include the examples of the present disclosure. Of course, it is not possible to describe all considerable combinations of components or methods for the purpose of describing the present disclosure, but it will be appreciated by those skilled in the art that a lot of additions of the present disclosure can be combined or replaced. Therefore, the present disclosure is used for embracing all of the changes, modifications, and transformations included in the spirit and the scope of the appended claims. Moreover, it is construed that up to a degree in which a term "include" is used in any one of the detailed description and the claims, when the term is used as a transitional word in the claims, the term is interpreted in a similar manner to the term "comprising".

The present disclosure has been described with reference to the preferred embodiments. However, it will be appreciated by those skilled in the art that various modifications and changes of the present disclosure can be made without departing from the spirit and the scope of the present disclosure which are defined in the appended claims and their equivalents.

What is claimed is:

1. A method for providing knowledge based e-commerce performed by a computing device including one or more processors and a main memory storing commands executable by the processors, the method comprising:
  receiving a question and an answer which are collected by a collection module by using a network, wherein the question and the answer for the question are collected from a knowledge sharing platform in which the answer is input and then separated into processes in order to store data for providing an answer to search information received from a user terminal in a storage space;
  extracting, by a process extracting module, a process for solving the question by analyzing the collected answer;

matching, by a process processing module, additional information to each of the extracted processes and storing the matched additional information in the storage space;

receiving, by a communication module, search information from a user terminal via a network; and sending, by the communication module, at least one of the answer, the process, and the matched additional information corresponding to the search information to the user terminal via the network, wherein the extracting of the process for solving the question includes:

receiving, by the process extracting module, a collected feedback information for the answerer;

determining, by the process extracting module, the reliability of the answerer based on the collected feedback information;

determining, by the process extracting module, a keyword by receiving the collected an answer of which the reliability is equal to or higher than the predetermined threshold; and separating, by the process extracting module, the answer into one or more processes at least partially based on the extracted keyword.

2. The method of claim 1, further comprising:
determining, by the process extracting module, a category of at least one of the collected question and answer and matching an object to at least one of the question and the answer and storing the matched object to at least one of the question and the answer in the storage space.

3. The method of claim 1, wherein the question and the answer include at least e-commerce associated contents.

4. The method of claim 1, wherein the additional information includes at least one of a URL link which includes data that can access the resources hosted by the internet server associated with the process, a URL link which includes data that can access the resources hosted by the internet server that sells an item or a service associated with the process, or contains a contact, a map, and an address.

5. The method of claim 1, wherein the receiving, by the communication module, the search information from the user terminal by using a network includes:

receiving, by the communication module, category information from the user terminal by using the network; and receiving, by the communication module, an object from the user terminal by using the network.

6. The method of claim 1, wherein the extracting of the process for solving the question includes receiving, by the process extracting module, a collected feedback information of a questioner for an answerer of the answer, determining, by the process extracting module, reliability of the answerer based on the collected feedback information, determining, by the process extracting module, a keyword and storing the keyword in the storage space by receiving the collected answer of the answerer of which the reliability is equal to or higher than a predetermined threshold, and separating, by the process extracting module, the answer into one or more processes at least partially based on the extracted keyword.

7. The method of claim 6, wherein the separating of the answer into one or more processes at least partially based on the extracted keyword includes separating, by the process extracting module, the answer into one or more processes at least partially based on the keyword and the number of repetition times of a keyword associated with the keyword in the answer.

8. A server for providing knowledge based e-commerce, the server comprising:
one or more processors; and
a memory storing commands which are executable by the processors,
wherein the one or more processors include
a collection module receiving a question and an answer which is collected by using a network, wherein the question and the answer for the question are collected from a knowledge sharing platform in which the answer is input and then separated into processes in order to store data for providing an answer to search information received from a user terminal in a storage space, a process extracting module receiving collected feedback information for the answer, determining the reliability of the answer based on the collected feedback information, determining a keyword and storing the keyword in the storage by receiving the collected answer of which the reliability is equal to or higher than the predetermined threshold, separating the answer into one or more processes at least partially based on the extracted keyword, and extracting a process for solving the question;

a process processing module matching additional information to each of the extracted processes and storing the matched additional information in the storage space, and a communication module receiving search information from a user terminal by using a network, and sending at least one of the answer, the process, and the matched additional information corresponding to the search information to the user terminal by using the network.

9. A non-transitory computer-readable storage medium including a plurality of commands executed by one or more processors, which allows a computer to execute the following steps by the plurality of commands stored in the non-transitory computer-readable storage medium, the steps comprising:

receiving a question and an answer which are collected, by a collection module by using a network, wherein the question and the answer for the question are received from a knowledge sharing platform in which the answer is input and then separated into processes in order to store data for providing an answer to search information received from a user terminal in a storage space;

receiving collected feedback information for the answer, determining the reliability of the answerer based on the collected feedback information;

determining a keyword and storing the keyword in the storage space by receiving the collected answer of which the reliability is equal to or higher than the predetermined threshold;

separating the answer into one or more processes at least partially based on the extracted keyword; and extracting, a process for solving the question by a process extracting module;

matching, by a process processing module, additional information to each of the extracted processes and storing the matched additional information in the storage space;

receiving, by a communication module, search information from a user terminal by using a network; and sending, by the communication module, at least one of the answer, the process, and the matched additional information corresponding to the search information to the user terminal by using the network.

\* \* \* \* \*